United States Patent
Theodoras, II

(10) Patent No.: US 7,461,179 B1
(45) Date of Patent: Dec. 2, 2008

(54) UNIVERSAL SFP SUPPORT

(75) Inventor: James T. Theodoras, II, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 654 days.

(21) Appl. No.: 10/837,223

(22) Filed: Apr. 30, 2004

(51) Int. Cl.
*G06F 3/00* (2006.01)
*G06F 13/38* (2006.01)
*G06F 11/00* (2006.01)

(52) U.S. Cl. .................. 710/15; 710/16; 710/62; 370/248

(58) Field of Classification Search .......... 370/248, 370/282; 710/1, 15–19, 62, 65
See application file for complete search history.

(56) References Cited

U.S. PATENT DOCUMENTS

| | | | |
|---|---|---|---|
| 6,328,480 B1 * | 12/2001 | Strike | 385/75 |
| 6,430,053 B1 | 8/2002 | Peterson et al. | |
| 6,439,918 B1 | 8/2002 | Togami et al. | |
| 6,533,603 B1 | 3/2003 | Togami | |
| 6,556,445 B2 | 4/2003 | Medina | |
| 6,570,768 B2 | 5/2003 | Medina | |
| 6,655,995 B1 | 12/2003 | Reisinger et al. | |
| 7,054,309 B1 * | 5/2006 | Hoot et al. | 370/360 |
| 7,118,281 B2 * | 10/2006 | Chiu et al. | 385/53 |
| 2003/0179711 A1 * | 9/2003 | Huff | 370/248 |

OTHER PUBLICATIONS

BCM5201/BCM5202 10/100BASE-TX/FX Mini-φ™ Transceiver; Mar. 2, 1999; Broadcom Corporation; pp. 1-49.*

* cited by examiner

*Primary Examiner*—Alford W. Kindred
*Assistant Examiner*—Richard Franklin
(74) *Attorney, Agent, or Firm*—Cindy Kaplan

(57) ABSTRACT

Techniques for supporting optical and electrical protocols, such as on the ports of a line card in a network device, are provided. A port on a line card supports optical and electrical connections. The PHY monitors a signal to determine if the transmission connection at the port has changed, such as from optical to electrical, or vice versa. If there has been a change, the PHY is directed to reset a port to correspond to the appropriate transmission connection. By resetting the port, the PHY changes the protocol that is utilized with the signals (e.g., NRZI or 3-Level MLT3).

22 Claims, 7 Drawing Sheets

UNIVERSAL SFP SUPPORT

BACKGROUND OF THE INVENTION

The present invention relates to networks. More specifically, the invention relates to techniques for supporting electrical and optical connections in network devices.

The earliest networks used electrical signals over copper wires. Although networks have come a long way over the years, this is still a popular transmission methodology. However, light signals over optical cables is now the standard transmission methodology for high bandwidth network connections.

As fiber optics developed, many new technologies emerged to enhance their use. For example, fairly recently, a specification for a new generation of optical modular transceivers was developed named "small form-factor pluggable" (SFP). SFP transceivers are designed to be high bandwidth, small physical size and easily changeable (including being hot-swappable). The changeable nature or SFPs allows repairs and upgrades to be done much more efficiently.

Network devices typically have a backplane in which numerous line cards can be inserted. As SFPs are optical transceivers, they are typically found on line cards that support optical connections. Thus, there are line cards that support multiple electrical connections (e.g., RJ45) and other line cards that support multiple optical connections. Because the underlying format and encoding of the signals is different, line cards were typically designed as either electrical or optical.

However, there soon became a demand for line cards that could support both electrical and optical connections. This has been accomplished using what will be called "copper SFPs" because they plug into ports on line cards like optical SFPs. These implementations have numerous disadvantages.

First off, this approach typically utilizes a conversion integrated circuit (IC) within the optical SFPs in order to convert from optical to electrical formats and encoding that are supported by the line card. Additionally, an interfacing application specific IC (ASIC) may be required that incorporates a proprietary SGMII interface to support lower data rates such as 10BASE-T and 100BASE-T. The additional circuitry adds complexity and cost that has made this solution less than satisfactory.

It would be beneficial to have innovative techniques for allowing line cards to support optical and electrical connections, including the capability to allow a port to support optical and electrical transceivers. Additionally, it would be beneficial if none or a small amount of additional circuitry was needed to provide these capabilities.

SUMMARY OF THE INVENTION

The present invention provides innovative techniques for supporting optical and electrical connections, such as on ports of a line card in a network device. In general, a port on a line card can support optical and electrical connections (e.g., through a transceiver). The PHY monitors a signal (e.g., on a signal detect or SD pin) to determine if the transmission connection at the port has changed, such as from optical to electrical, or vice versa. If there has been a change, the PHY is directed to reset a port to correspond to the appropriate transmission connection.

Advantages include line cards can be developed where each port can support either an optical or electrical connection. Additionally, this flexibility can be achieved with zero or minimal additional circuitry, which reduces costs. Other savings are that expensive conversion ASICs and SGMII-compatible ASICs may not be necessary. Some specific embodiments of the invention are described below.

In one embodiment, the invention provides a method of selecting optical or electrical transmissions on a port of a line card in a network device, the line card including an integrated circuit that supports optical and electrical transmissions. The integrated circuit is monitored to determine whether a port has a transmission connection, optical or electrical, that is different than the port is configured. If it is determined that the port has a transmission connection that is different than the port is configured, the integrated circuit is then instructed to reset the port to the transmission connection at the port.

In another embodiment, the invention provides a method of selecting optical or electrical transmissions on a port of a line card in a network device, the line card including an integrated circuit that supports optical and electrical transmissions. A first register of the integrated circuit is monitored to determine whether a port has a transmission connection, optical or electrical, that is different than the port is configured. If it is determined that the port has a transmission connection that is different than the port is configured, a second register of the integrated circuit is modified to specify the port that has a transmission connection that is different than the port is configured. Then, the integrated circuit is instructed to reset the port specified by the second register to the transmission connection at the port.

Other features and advantages of the invention will become readily apparent upon review of the following description in association with the accompanying drawings, where the same or similar structures are designated with the same reference numerals.

DETAILED DESCRIPTION OF EMBODIMENTS

In the description that follows, the present invention will be described in reference to embodiments that are used in association with optical and electrical Ethernet connections in line cards of network devices. However, embodiments of the invention are not limited to any particular version, protocol, environment, application, or implementation. For example, although embodiments of the invention will be described in reference to line cards, the invention can be advantageously applied to many different types of network devices. Therefore, the description of the embodiments that follows is for purposes of illustration and not limitation.

Figure 1:
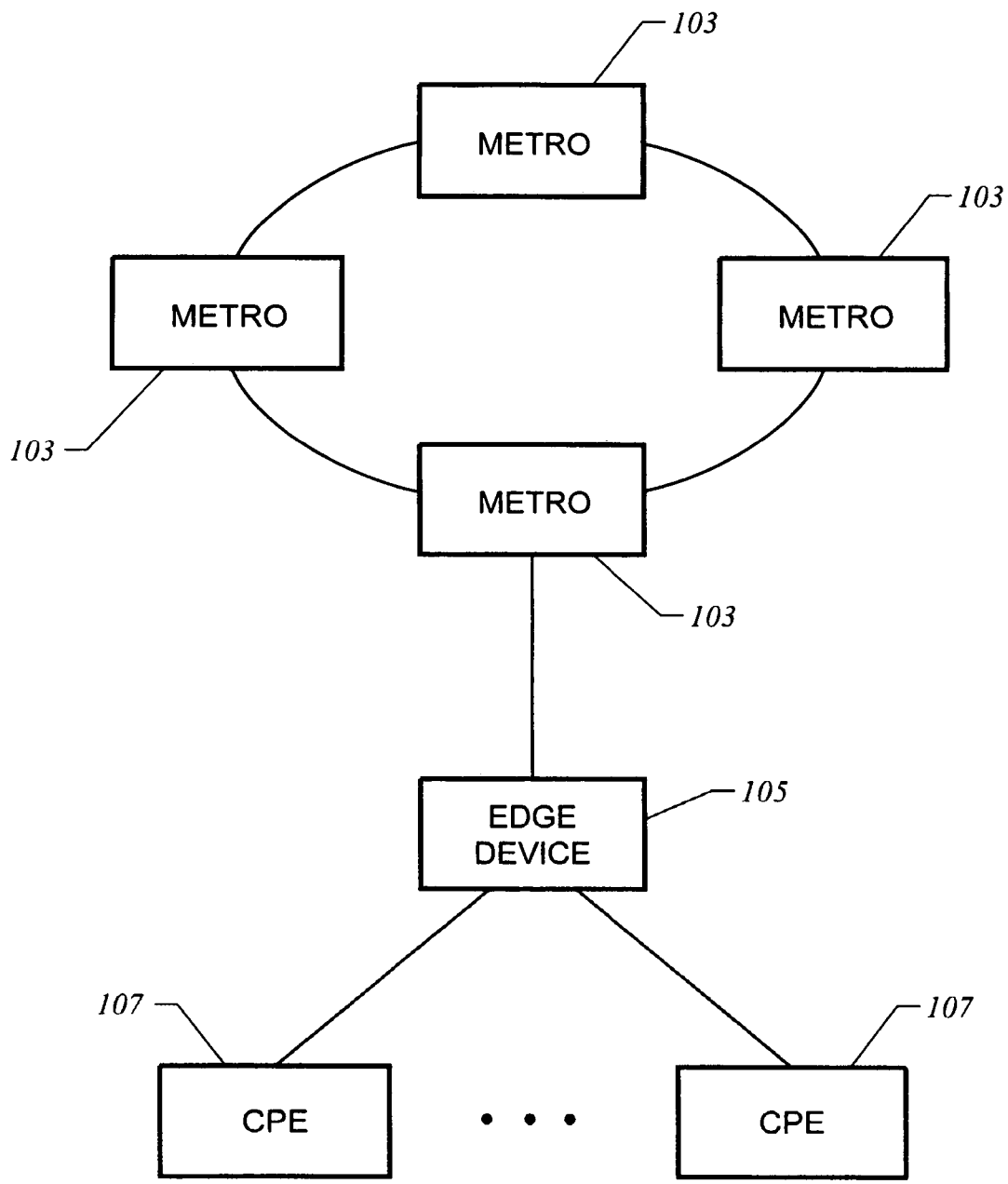
FIG. 1 shows an example of a network including multiple network devices.

FIG. 1 shows an example of a network including multiple network devices. The network shown is intended to illustrate an example of network devices and systems that can utilize embodiments of the invention. However, the invention is not limited to the network shown and can be utilized in other network configurations.

Within a metropolitan area, metro network elements 103 can transmit network data within a ring such as a Synchronized Optical Networks (SONET) ring. An example of a metro element 103 is the Cisco ONS 15454 available from Cisco Systems, Inc., San Jose, Calif. Typically, the SONET ring is connected to high speed optical core through a cross-connect network element (not shown).

An edge device 105 transmits network data to and from customer premise equipment (CPE) 107. Edge device 107 is a network element that, among other things, receives network data for one of the customer premise equipment 109 and routes the network data to the appropriate destination. An example of edge device 107 is the Cisco ONS 15327 available from Cisco Systems Inc., San Jose, Calif. Although this network description is (or is expected to be) fairly common, embodiments of the invention are not limited the network as has been described.

Figure 2:
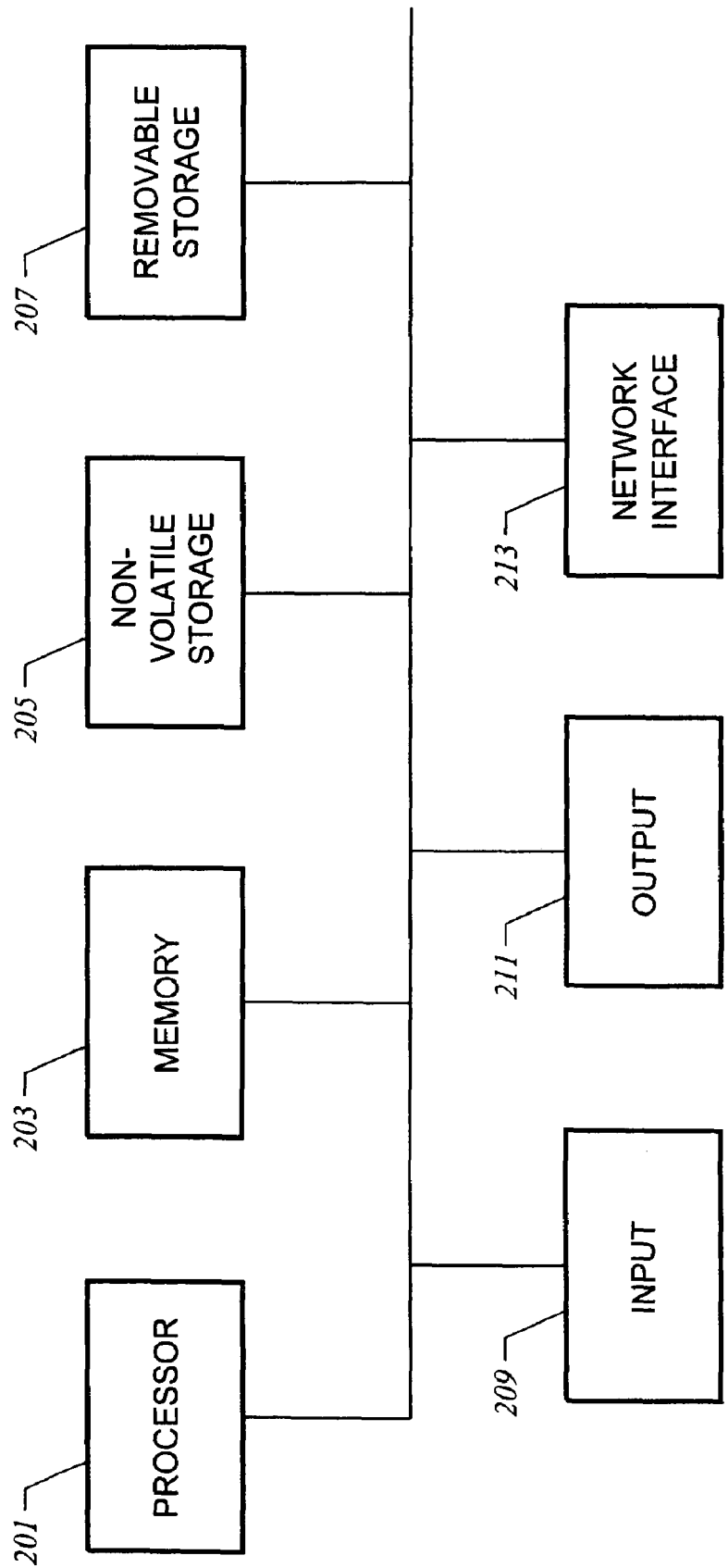
FIG. 2 illustrates a block diagram of a network device, computer system or subsystems thereof that can utilize embodiments of the invention.

Now that an exemplary network has been described, FIG. 2 shows a block diagram of components that can be present in network devices and computer systems that incorporate embodiments of the invention. A processor 201 executes code (or instructions) that direct the operation of the processor. Although processors typically have memory caches, processor 201 utilizes memory 203, which can store code and data.

A non-volatile storage 205 can store code and data such that it is typically persistent and provides more storage when compared to memory 203. At present, a common non-volatile storage is one or more hard drives. A removable storage 207 provides mobility to code and/or data that are stored thereon. Examples of removable storage are floppy disks, tape, CD/ROM, flash memory devices, and the like.

Memory 203, non-volatile storage 205 and removable storage 207 provide examples of computer readable storage media that can be utilized to store and retrieve computer programs incorporating codes that implement the invention, data for use with the invention, and the like. Additionally, a data signal embodied in a carrier wave (e.g., in a network including the Internet) is an example of a transmission medium. An input 209 allows a user to interface with the system. Input can be done through the use of a keyboard, a mouse, buttons, dials, or any other input mechanism. An output 211 allows the system to provide output to the user. Output can be provided through a monitor, display screen, LEDs, printer or any other output mechanism. Input and/or output can also be performed externally through a network interface 213.

Network interface 213 allows the system to interface with a network to which it is connected. The components shown in FIG. 2 can be found in many network devices and computer systems. However, components can be added, deleted and combined so FIG. 2 is for illustration purposes. Additionally, these components can also be present on subsystems (e.g., line cards) in network devices and computer systems.

Figure 3:
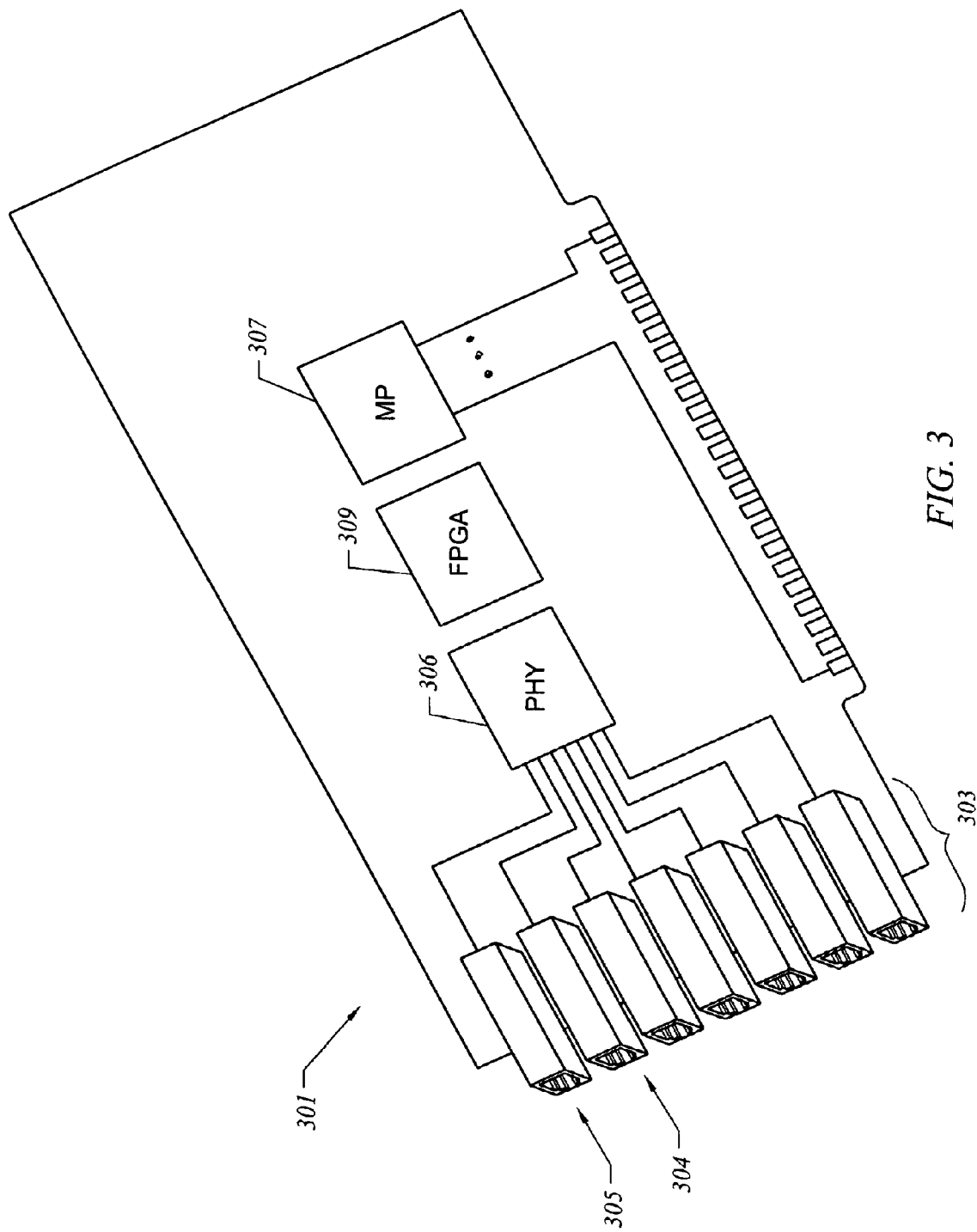
FIG. 3 shows a high level block diagram of a line card for use in a network device.

Network devices typically incorporate multiple slots for inserting various line cards. FIG. 3 shows an example of a line card that can be present in a network device. Line card 301 includes a number of ports that can accept transceiver modules 303. As described above, a transceiver module can be a SFP module for optical connections with an LC connector such as transceiver module 304. Additionally, a transceiver module can include an RJ45 module for electrical connections such as transceiver module 305. For simplicity, an SFP module that accepts RJ45 connections is called a copper SFP as opposed to the more conventional optical SFP.

PHY 305 is an integrated circuit that is utilized to interface between transceiver modules 303 and a processor (or microprocessor) 307 on the line card. The processor could also be located in the network device.

In some embodiments, an field programmable gate array (FPGA) 309 is utilized to monitor registers of PHY 305. FPGA 309 can store appropriate values in its own registers. Processor 307 then polls the values in the registers of FPGA 309. For simplicity, other components that may be present on the line card are not shown.

Although the signals PHY 305 receives from the transceiver modules are electrical signals, the format and encoding can be different, for example depending on the physical (optical or electrical) media that carried the signals to the transceiver module. Upon resetting a port in response to a change in connection type of the transceiver module, embodiments of the invention switch protocols, such as from NRZI for optical connections and 3-Level MLT3 for electrical connections (or vice versa). This is important because the wave forms that drive the optical and magnetic (in the case of electrical signals) components are different. An exemplary PHY is BCM5228 that is available from Broadcom Corporation, Irvine, Calif.

For a number of reasons including cost savings, PHY 305 may be manufactured to process signals from electrical and optical transceivers. For example, the PHY can detect at powerup the type of transmission connection (e.g., optical or electrical) that is at each port. The PHY then configures the port for the appropriate connection. For example, a signal on a Signal Detect (SD) pin of the PHY can indicate whether the connection is optical or electrical.

With embodiments of the invention, the PHY is monitored to determine the connection at each of the ports. If the configuration of the port does not match the connection at the port, the PHY is instructed to reset the port so that the port has the appropriate configuration.

Figure 4:
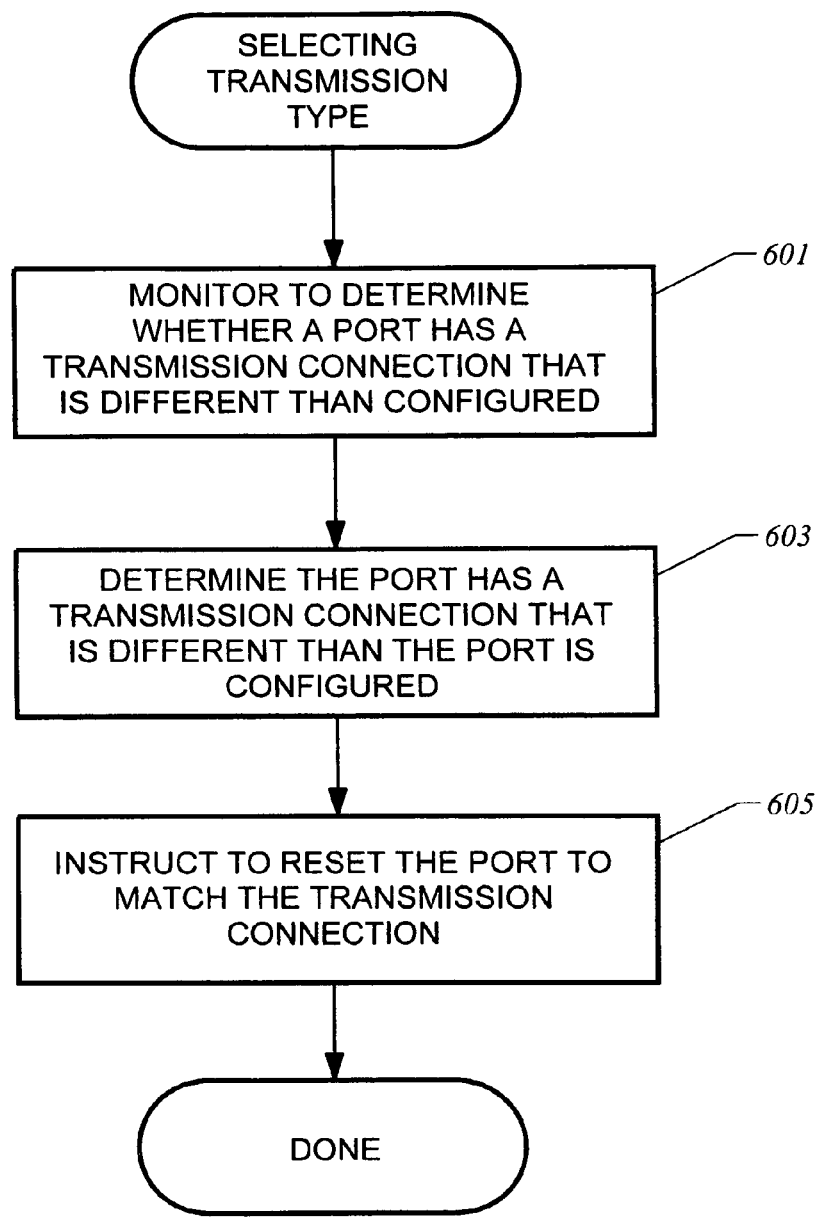
FIG. 4 shows a flowchart of a process of selecting optical or electrical transmissions on a port of a line card in a network device.

FIG. 4 shows a flowchart of a process of selecting optical or electrical transmissions on a port of a line card in a network device. As with all the flowcharts shown herein, steps can be added, deleted, combined, and reordered without departing from the spirit and scope of the invention.

At a step 601, the integrated circuit (or PHY) is monitored to determine whether a port has a transmission connection that is different than configured. If it determined at a step 603 that the port has a transmission connection that is different than configured, the integrated circuit is instructed to reset the port to match the transmission connection at a step 605.

The PHY selects the appropriate protocol for use with the transmission connection. For example, the PHY may be utilizing the NRZI protocol for an optical connection that is specified by the optical transceiver module at the port. If the transceiver module at the port is replaced with an electrical transceiver module, the port would be reset and the 3-Level MLT3 protocol for the electrical connection that is specified by the electrical transceiver module. These protocols are exemplary and other protocols may be utilized with the invention.

In this manner, a line card can be designed that supports both optical and electrical transceiver modules (e.g., optical and copper SFPs). Additionally, since SFPs are designed to be swappable, the number of each different type of transceiver module can be varied to fit the application (i.e., instead of being hardwired). This flexibility can be achieved with zero or minimal additional circuitry, which reduces costs. Other savings are that expensive conversion AISICs and SGMII-compatible ASICs may not be necessary.

Figure 5:
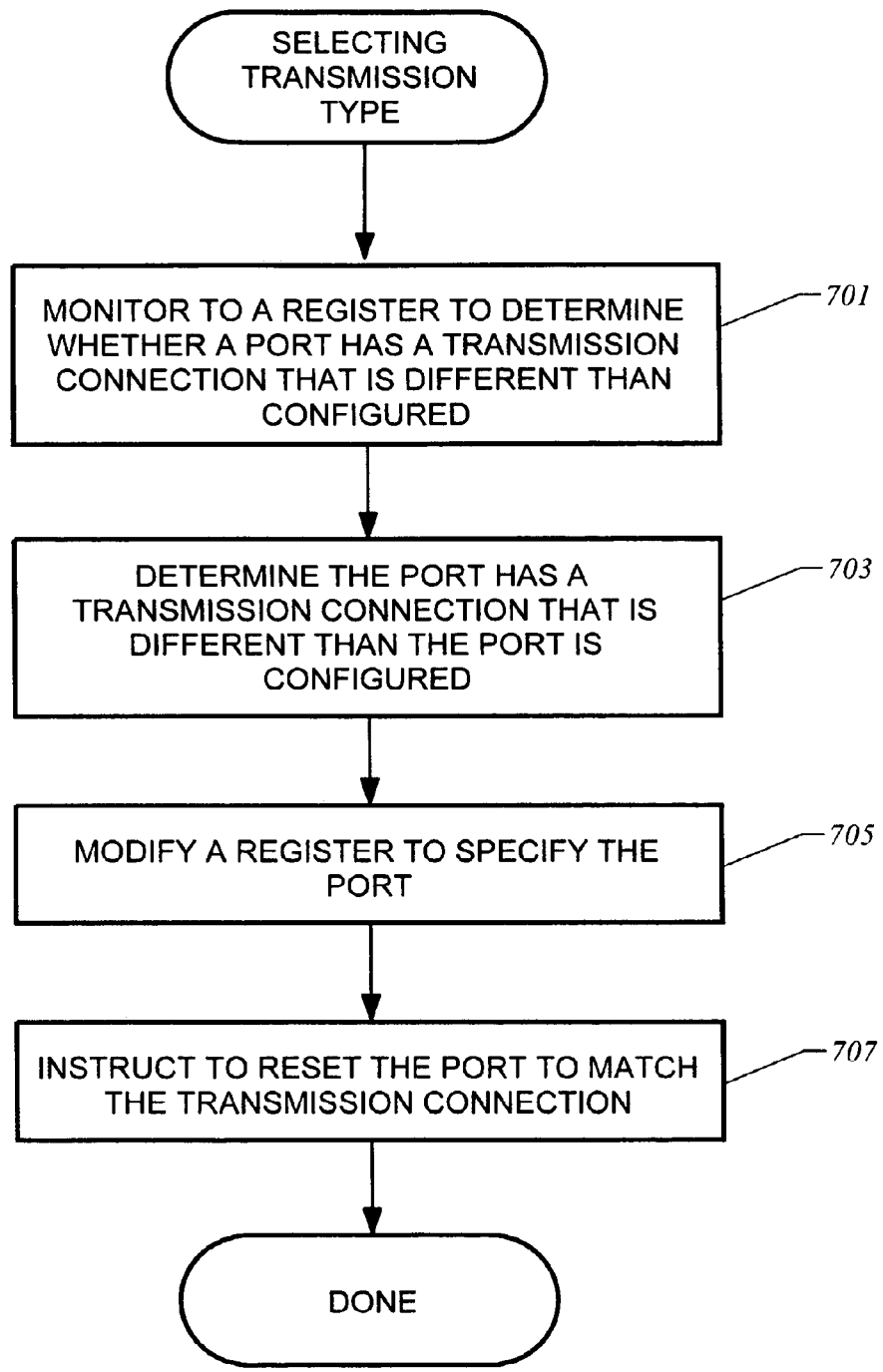
FIG. 5 shows a flowchart of another process of selecting optical or electrical transmissions on a port of a line card in a network device.

With some PHY (e.g., BCM5228 mentioned above), the PHY stores the signal on the SD pin for each port in a register. Additionally, the PHY has a command that instructs the PHY to reset a port (or ports) specified by another register. FIG. 5 shows a flowchart of another process of selecting optical or electrical transmissions on a port of a line card in a network device that utilizes this or a similarly functioning PHY.

At a step 701, a register is monitored to determine whether a port has a transmission connection that is different than configured. For example, if on powerup, the PHY detected through the SD signal that the port had an optical transmission connection, the port would be configured for optical transmissions. Thus, the transceiver module would be an optical SFP.

If later in time, the transmission connection changes, such as the optical SFP is swapped to a copper SFP, the corresponding SD signal would change. This change would be reflected in the register (e.g., an internal pulldown register) of the PHY.

A processor monitors the register of the PHY to detect these changes. As described above, in alternative embodiments, the PHY may be monitored by an FPGA, which is in turn monitored by the processor. However it is implemented, at a step 703, it determined that the port has a transmission connection that is different than configured. For example, an optical SFP has been swapped for a copper SFP, or vice versa.

At a step 705, a register is modified in the PHY to specify the port that has a transmission connection that is different than configured. The PHY is then instructed to reset the port to match the transmission connection at a step 707. For example, the command can instruct the PHY to reset any ports specified in the register that was modified in step 705. As described above, resetting a port can change the protocol that is utilized with the signals from the transceiver module.

Figure 6:
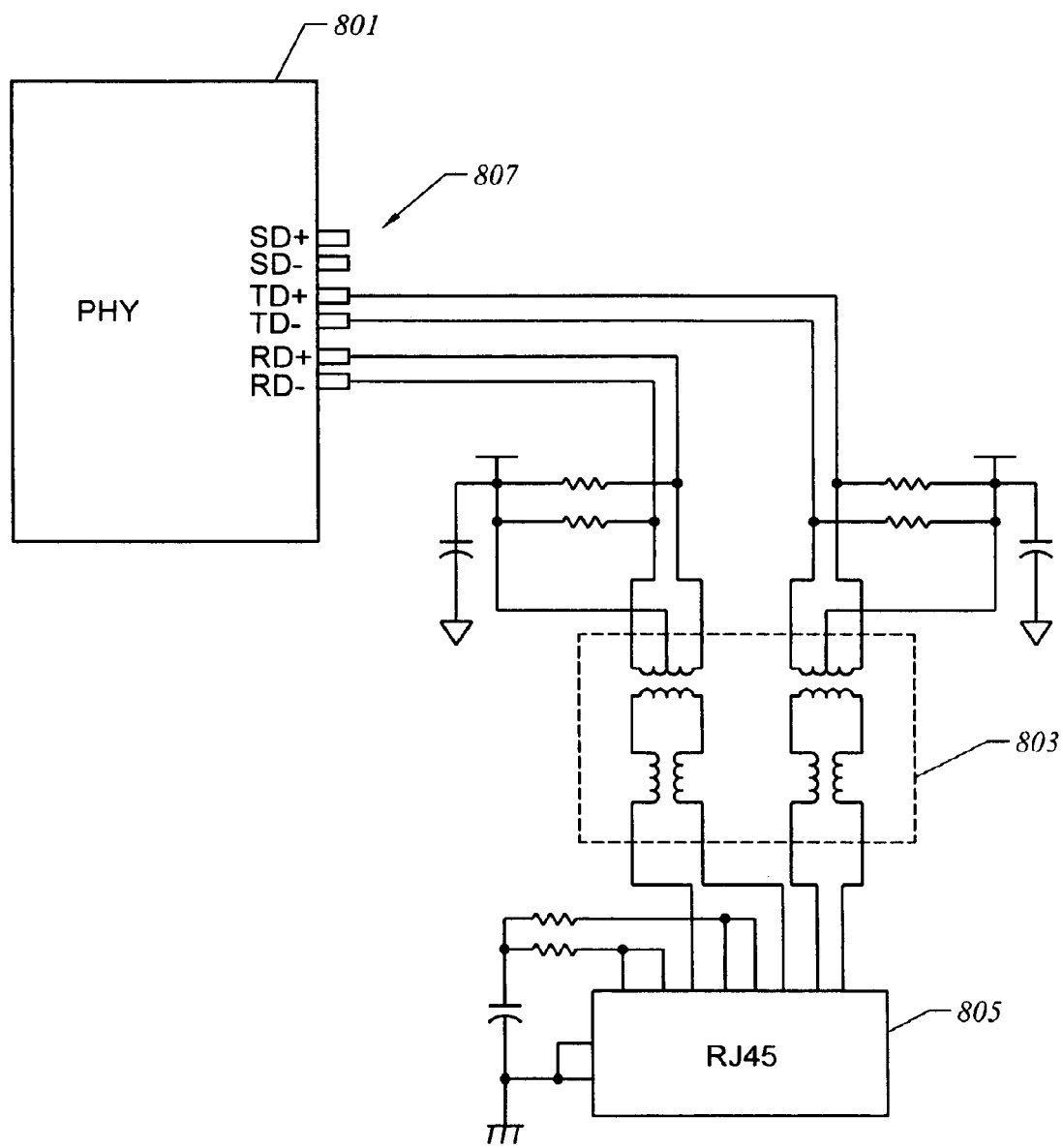
FIG. 6 illustrates an embodiment of circuitry and components in a copper SFP for use with the invention.

Now that exemplary processes have been described, it may be beneficial to show embodiments of copper and optical SFPs that can be utilized with the invention. FIG. 6 illustrates an embodiment of circuitry and components in a copper SFP.

A PHY 801 includes pins for signal detection (SD), transmit detection (TD) and receive detection (RD). Typically, PHY 801 includes other pins which have been omitted for simplicity.

In order to support 10BASE-T and 100BASE-T, three-level MLT3 are utilized to drive the magnetics 803 in RJ45 connector 805 at the end of the transceiver module. As shown, SD pins 807 for the port are left floating, thus indicating an electrical connection at the port to the PHY.

The copper SFP shown in FIG. 6 can have minimal complexity and cost, yet allow support for electrical connections from optical ports. In some embodiments, an active level shifting circuit may be utilized.

Figure 7:
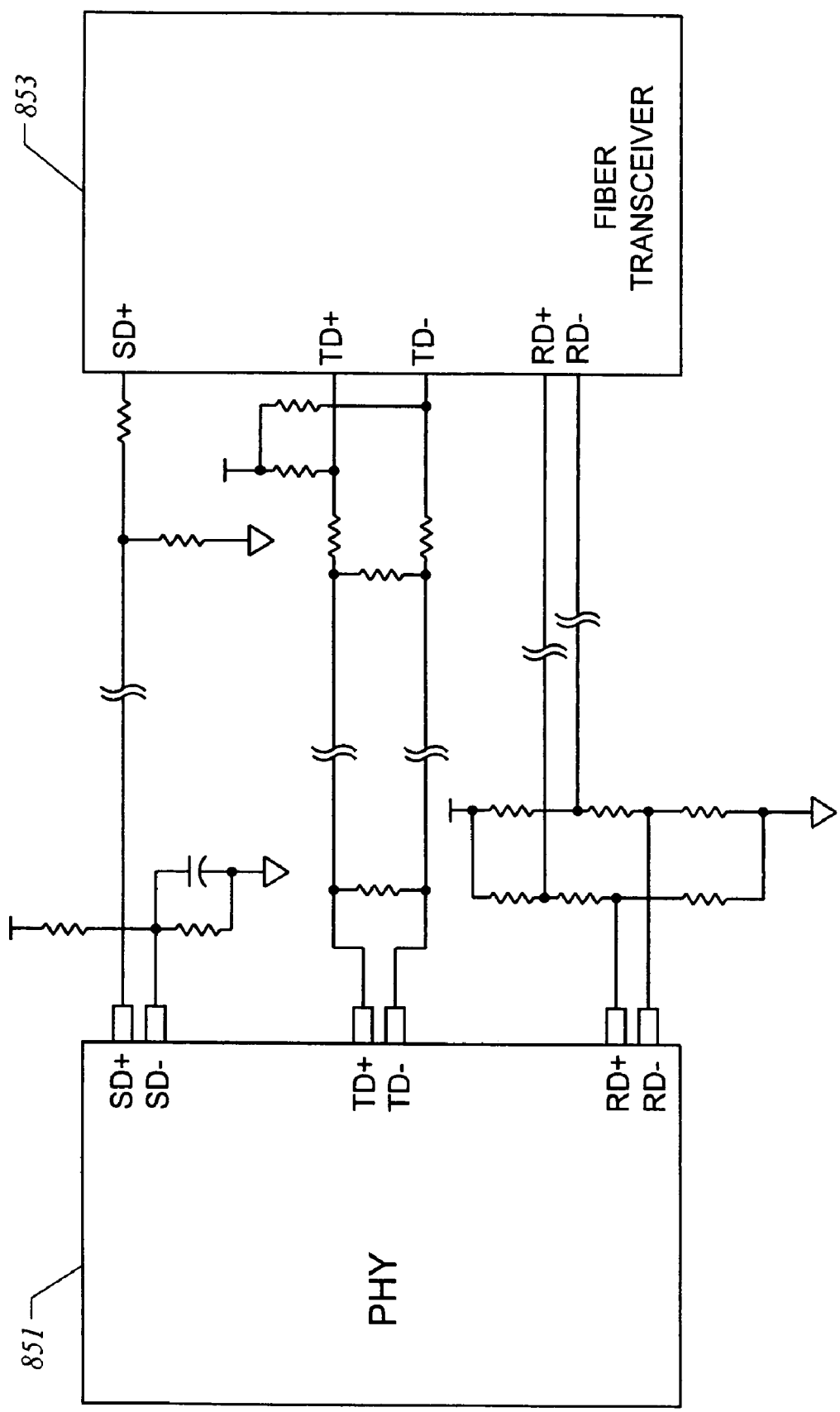
FIG. 7 illustrates an embodiment of circuitry and components in an optical SFP for use with the invention.

FIG. 7 illustrates an embodiment of circuitry and components in an optical SFP for use with the invention. A PHY 851 is connected to a fiber transceiver 853, which is housed in the transceiver module. As shown, the SD pins are routed from the PHY to the fiber transceiver in the optical SFP. This SD signal is utilized by PHY 851 to detect optical connections at powerup. With embodiments of the invention, the status of the port is monitored to configure ports to the appropriate transmission connection during operation.

While the above is a complete description of preferred embodiments of the invention, various alternatives, modifications, and equivalents can be used. It should be evident that the invention is equally applicable by making appropriate modifications to the embodiments described above. For example, although the invention has been described in relation to specific embodiments, the invention can be advantageously applied to other embodiments. Therefore, the above description should not be taken as limiting the scope of the invention as defined by the metes and bounds of the appended claims along with their full scope of equivalents

The invention claimed is:

1. A method of selecting optical or electrical transmissions on a port of a line card in a network device, the line card including an integrated circuit that supports optical and electrical transmissions, comprising:
    monitoring the integrated circuit to determine whether the port has a transmission connection to a transceiver module that is different than the port is configured, wherein the port comprises a single transmission connection to the transceiver module which is configured for either optical or electrical transmission;
    determining that the port has the transmission connection that is different than the port is configured; and
    instructing the integrated circuit to reset the port to the transmission connection at the port.

2. The method of claim 1, wherein a signal detect (SD) signal on a pin on the port indicates whether the transmission connection is optical or electrical.

3. The method of claim 2, wherein the integrated circuit stores in a register the values of the SD signal for each of the ports of the line card.

4. The method of claim 3, wherein the monitoring the integrated circuit comprises monitoring the register to detect changes in the register.

5. The method of claim 1, wherein the instructing the integrated circuit comprises sending an instruction to the integrated circuit to reset the port as is specified in a register.

6. The method of claim 5, further comprising modifying the register to specify the port.

7. The method of claim 1, wherein the integrated circuit is designed to configure the transmission connection of each port of the line card at powerup.

8. The method of claim 1, wherein resetting the port changes a protocol utilized with signals from the transmission connection.

9. The method of claim 8, wherein the protocol is NRZI for optical or 3-Level MLT3 for electrical.

10. A computer program product for selecting optical or electrical transmissions on a port of a line card in a network device, the line card including an integrated circuit that supports optical and electrical transmissions, comprising:
    computer code that configures a processor to monitor the integrated circuit to determine whether the port has a transmission connection to a transceiver module that is different than the port is configured, wherein the port comprises a single transmission connection to the transceiver module which is configured for either optical or electrical transmission;
    computer code that determines that the port has the transmission connection that is different than the port is configured;
    computer code that configures a processor to instruct the integrated circuit to reset the port to the transmission connection at the port; and
    a computer readable medium that stores the computer codes.

11. An apparatus that selects optical or electrical transmissions on a port of a line card in a network device, the line card including an integrated circuit that supports optical and electrical transmissions, comprising:
    means for monitoring the integrated circuit to determine whether the port has a transmission connection to a transceiver module that is different than the port is configured, wherein the port comprises a single transmission connection to the transceiver module which is configured for either optical or electrical transmission;

means for determining that the port has the transmission connection that is different than the port is configured; and means for instructing the integrated circuit to reset the port to the transmission connection at the port.

12. A line card for a network device that selects optical or electrical transmissions on a port of a line card in a network device, the line card including an integrated circuit that supports optical and electrical transmissions, comprising:

computer code that configures a processor to monitor the integrated circuit to determine whether the port has a transmission connection to a transceiver module that is different than the port is configured, wherein the port comprises a single transmission connection to the transceiver module which is configured for either optical or electrical transmission;

computer code that determines that the port has the transmission connection that is different than the port is configured;

computer code that instructs the integrated circuit to reset the port to the transmission connection at the port; and a computer readable medium that stores the computer codes.

13. A method of selecting optical or electrical transmissions on a port of a line card in a network device, the line card including an integrated circuit that supports optical and electrical transmissions, comprising:

monitoring a first register of the integrated circuit to determine whether the port has a transmission connection to a transceiver module that is different than the port is configured, wherein the port comprises a single transmission connection to the transceiver module which is configured for either optical or electrical transmission;

determining that the port has the transmission connection that is different than the port is configured;

modifying a second register of the integrated circuit to specify the port that has the transmission connection that is different than the port is configured; and instructing the integrated circuit to reset the port specified by the second register to the transmission connection at the port.

14. The method of claim 13, wherein a signal detect (SD) signal on a pin on the port indicates whether the transmission connection is optical or electrical.

15. The method of claim 14, wherein the integrated circuit stores in the first register the values of the SD signal for each of the ports of the line card.

16. The method of claim 15, wherein the monitoring the integrated circuit comprises monitoring the first register to detect changes in the first register.

17. The method of claim 13, wherein the integrated circuit is designed to configure the transmission connection of each port of the line card at powerup.

18. The method of claim 13, wherein resetting the port changes a protocol utilized with signals from the transmission connection.

19. The method of claim 18, wherein the protocol is NRZI for optical or 3-Level MLT3 for electrical.

20. A computer program product for selecting optical or electrical transmissions on a port of a line card in a network device, the line card including an integrated circuit that supports optical and electrical transmissions, comprising:

computer code that configures a processor to monitor a first register of the integrated circuit to determine whether the port has a transmission connection to a transceiver module that is different than the port is configured, wherein the port comprises a single transmission connection to the transceiver module which is configured for either optical or electrical transmission;

computer code that determines that the port has the transmission connection that is different than the port is configured;

computer code that configures a processor to modify a second register of the integrated circuit to specify the port that has the transmission connection that is different than the port is configured;

computer code that configures a processor to instruct the integrated circuit to reset the port specified by the second register to the transmission connection at the port; and a computer readable medium that stores the computer codes.

21. An apparatus that selects optical or electrical transmissions on a port of a line card in a network device, the line card including an integrated circuit that supports optical and electrical transmissions, comprising:

means for monitoring a first register of the integrated circuit to determine whether the port has a transmission connection to a transceiver module that is different than the port is configured, wherein the port comprises a single transmission connection to the transceiver module which is configured for either optical or electrical transmission;

means for determining that the port has the transmission connection that is different than the port is configured;

means for modifying a second register of the integrated circuit to specify the port that has the transmission connection that is different than the port is configured; and means for instructing the integrated circuit to reset the port specified by the second register to the transmission connection at the port.

22. A line card for a network device that selects optical or electrical transmissions on a port of a line card in a network device, the line card including an integrated circuit that supports optical and electrical transmissions, comprising:

computer code that configures a processor to monitor a first register of the integrated circuit to determine whether the port has a transmission connection to a transceiver module that is different than the port is configured, wherein the port comprises a single transmission connection to the transceiver module which is configured for either optical or electrical transmission;

computer code that determines that the port has the transmission connection that is different than the port is configured;

computer code that configures the processor to modify a second register of the integrated circuit to specify the port that has the transmission connection that is different than the port is configured;

computer code that configures the processor to instruct the integrated circuit to reset the port specified by the second register to the transmission connection at the port; and a computer readable medium that stores the computer codes.

* * * * *